United States Patent
Deb et al.

(12) 
(10) Patent No.: US 6,647,594 B1
(45) Date of Patent: Nov. 18, 2003

(54) GRAB HANDLE ASSEMBLY

(75) Inventors: Anindya Deb, Dearborn, MI (US); Matthew B. Makowski, Dearborn, MI (US); Nripen Kumar Saha, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/460,072

(22) Filed: Dec. 14, 1999

(51) Int. Cl.$^7$ ................................................ B62B 7/00
(52) U.S. Cl. ............................ 16/410; 16/444; 16/438; 16/431; 16/DIG. 40; 296/214
(58) Field of Search .................. 16/410, 444, 445, 16/415, 419, 420, DIG. 24; 296/210, 214, 71; D12/178, 195; 49/460, 502

(56) References Cited

U.S. PATENT DOCUMENTS

| 2,603,821 | A | * | 7/1952 | Bacon et al. ................. 16/412 |
| 4,021,072 | A |   | 5/1977 | Belanger |
| 4,067,602 | A |   | 1/1978 | Ahlisch et al. |
| 4,356,592 | A | * | 11/1982 | Moore ......................... 16/444 |
| 4,357,734 | A | * | 11/1982 | Moore ......................... 16/442 |
| 4,373,229 | A |   | 2/1983 | Moore |
| 4,912,808 | A |   | 4/1990 | Blakely |
| 4,971,645 | A |   | 11/1990 | Licus |
| 5,259,089 | A | * | 11/1993 | Baur et al. .................... 16/442 |
| 5,285,551 | A | * | 2/1994 | Weiland et al. ............... 16/442 |
| 5,403,064 | A | * | 4/1995 | Mahler et al. ............... 105/354 |
| 5,519,917 | A |   | 5/1996 | Cordonnier |
| 5,632,061 | A | * | 5/1997 | Smith et al. .................. 16/444 |
| 5,662,375 | A |   | 9/1997 | Adams et al. |
| 5,820,205 | A | * | 10/1998 | Ammons .................... 296/214 |
| 5,845,458 | A |   | 12/1998 | Patel |
| 5,931,525 | A | * | 8/1999 | Rickabus ..................... 16/444 |
| 6,106,055 | A | * | 8/2000 | Fischer ....................... 296/214 |
| 6,126,230 | A | * | 10/2000 | Ikeda et al. ................. 296/189 |
| 6,367,872 | B1 | * | 4/2002 | Bohm et al. ................. 296/210 |

FOREIGN PATENT DOCUMENTS

| GB | 2 134 464 A | 8/1984 |
| JP | 7-315098 | 12/1995 |

* cited by examiner

*Primary Examiner*—Chuck Y. Mah
(74) *Attorney, Agent, or Firm*—David B. Kelley

(57) ABSTRACT

A grab handle assembly for an interior of a motor vehicle includes a headliner disposed in the interior of the vehicle for mounting to a vehicle body of the motor vehicle. The headliner has a recess. The grab handle assembly also includes a grab handle disposed in the recess and spaced from the vehicle body to absorb energy when impacted.

20 Claims, 2 Drawing Sheets

GRAB HANDLE ASSEMBLY

BACKGROUND OF THE INVENTION

1. Field of the Invention

The present invention relates generally to grab handles for vehicles and, more specifically, to a grab handle assembly for an interior of a motor vehicle.

2. Description of the Related Art

It is known to provide a headliner for an interior of a motor vehicle. The headliner is typically made as a single piece and is mounted to an interior side of a roof of a vehicle body of the motor vehicle. An example of such a headliner is disclosed in U.S. Pat. No. 5,845,458 to Patel. In this patent, the headliner includes a relatively stiff molded backing sheet and a relatively deformable foam panel adhesively secured to the undersurface of the backing sheet. Marginal edge areas of the foam panel in contact with hard side rails on the roof are provided with resilient deformable foam inserts that prevent the hard side rails from interfering with the energy absorption action of the foam panel.

It is also known to provide a handle for an interior side of a door of the motor vehicle. The handle includes a metal insert of a sufficient strength to sustain the loads that can be applied when closing the door. The handle also includes a molded body disposed over the metal insert.

It is desirable to provide a roof/pillar grab handle for an interior of a motor vehicle that has energy absorbing capacity if impacted by an occupant of the motor vehicle. It is further desirable to provide a grab handle that offers head impact energy absorption. Therefore, there is a need in the art to provide a grab handle assembly for a motor vehicle that meets these desires.

SUMMARY OF THE INVENTION

Accordingly, the present invention is a grab handle assembly for an interior of a motor vehicle. The grab handle assembly includes a headliner disposed in the interior of the motor vehicle for mounting to a vehicle body of the motor vehicle. The headliner has a recess. The grab handle assembly also includes a grab handle disposed in the recess and spaced from the vehicle body to absorb energy when impacted by an occupant in the interior of the motor vehicle.

One advantage of the present invention is that a grab handle assembly is provided for a motor vehicle that offers head impact energy absorption. Yet another advantage of the present invention is that the grab handle assembly has energy absorbing capacity for meeting requirements of an upper interior head impact. Still another advantage of the present invention is that the grab handle assembly is used for interior headform impact energy absorption for a roof/pillar of the motor vehicle.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
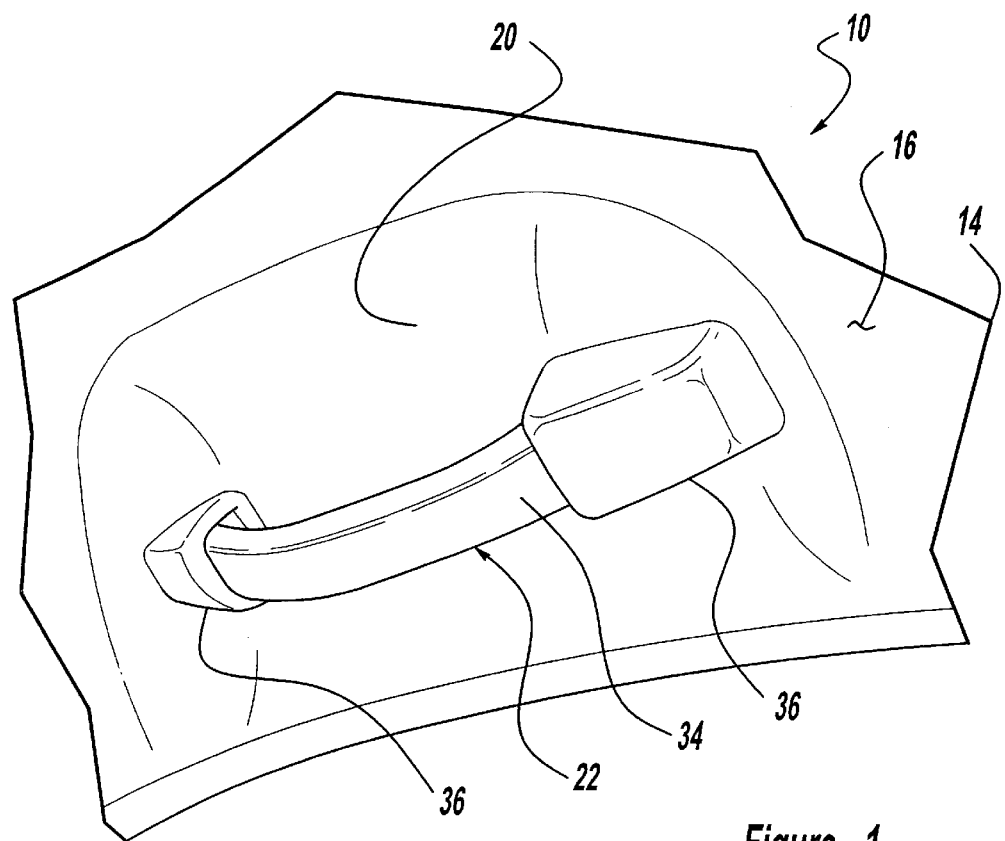
FIG. 1 is a perspective view of a grab handle assembly, according to the present invention, illustrated in operational relationship with an interior of a motor vehicle.
Figure 2:
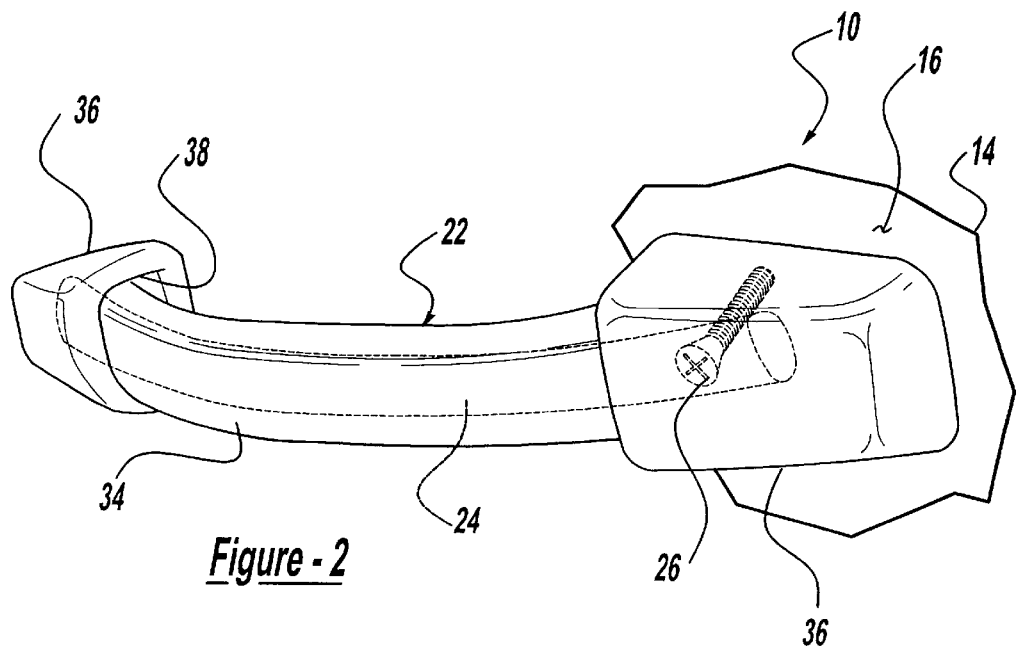
FIG. 2 is a perspective view of the grab handle assembly of FIG. 1.
Figure 3:
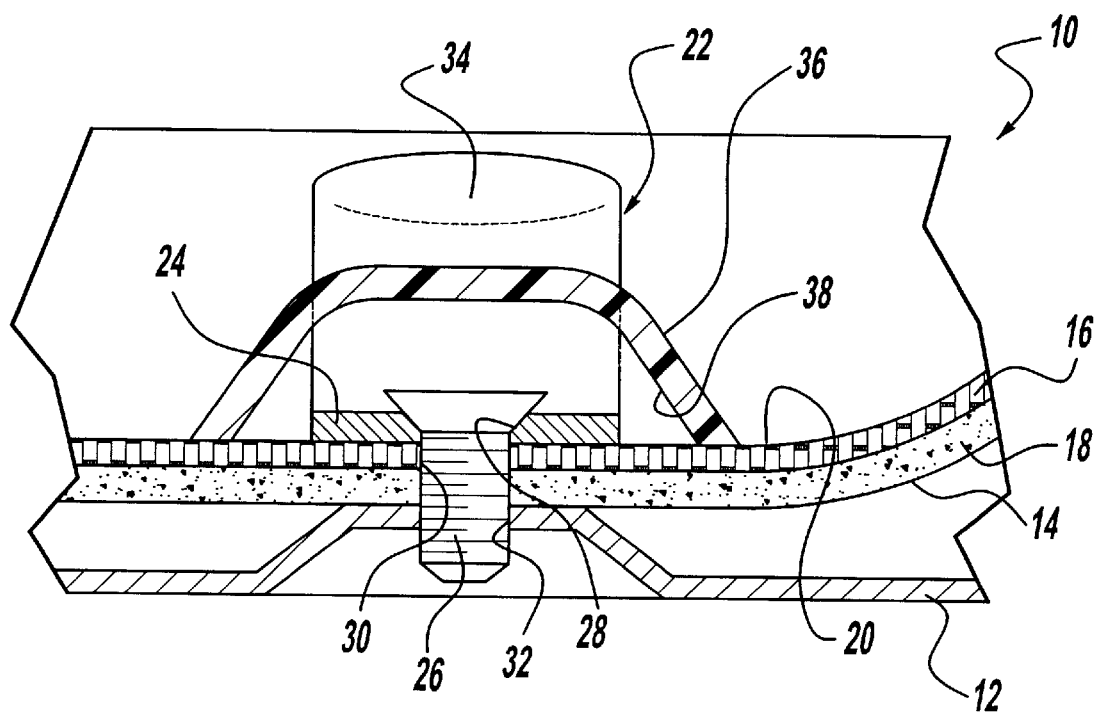
FIG. 3 is a fragmentary elevational view of the grab handle assembly of FIG. 1.

Referring to the drawings and in particular FIGS. 1 through 3, one embodiment of a grab handle assembly 10, according to the present invention, is illustrated for an interior or occupant compartment of a motor vehicle (not shown). The motor vehicle includes a vehicle body 12 forming a roof and pillars to define the interior of the motor vehicle. The motor vehicle includes the grab handle assembly 10 mounted to the vehicle body 12 in a manner to be described. It should be appreciated that, except for the grab handle assembly 10, the motor vehicle and vehicle body 12 are conventional and known in the art.

The grab handle assembly 10 includes a headliner 14 to cover an interior side of the roof and side rails of the vehicle body 12. The headliner 14 extends laterally and longitudinally and is generally rectangular in shape. The headliner 14 is made of a relatively stiff molded backing sheet 16 and a relatively deformable foam panel 18 adhesively secured to the undersurface of the backing sheet 16. The headliner 14 is formed as a single piece. The headliner 14 has at least one depression or recess 20 adjacent a roof side rail, pillar or roof of the vehicle body 12. The recess 20 extends inwardly toward the vehicle body 12 and is generally rectangular in shape for a function to be described.

The grab handle assembly 10 also includes a grab handle, generally indicated at 22, disposed in the recess 20 and connected to, preferably the roof side rail, of the vehicle body 12 by suitable means such as fasteners (not shown). The grab handle 22 includes an inner strap 24 extending longitudinally and being generally rectangular in shape. The inner strap 24 is made of a metal material and is responsible for the required grab handle stiffness and energy absorption capability. The inner strap 24 has a predetermined thickness such as three millimeters (3 mm) and is made of mild steel or other similar metal alloys to act as an energy-absorbent spring.

The grab handle 22 includes a fastener 26 such as a screw extending through an aperture 28 in each end of the strap 24 and an aperture 30 in the headliner 14 and aperture 32 in the vehicle body 12. The fastener 26 secures each end of the inner strap 24 to the vehicle body 12. It should be appreciated that any suitable means may be used to attach the inner strap 24 to the vehicle body 12.

The grab handle 22 also includes an outer cover 34 disposed over a majority of a length of the inner strap 24. The outer cover 34 is generally tubular in shape and extends longitudinally. The outer cover 34 is made of a plastic material. It should be appreciated that the inner strap 24 extends through the outer cover 34 and that a user (not shown) grasps the outer cover 34 to grab onto the grab handle 22.

The grab handle 22 further includes an end cap 36 to cover each end of the grab handle 22. The end cap 36 is generally rectangular in shape. The end cap 36 extends longitudinally and has a cavity 38 in one longitudinal end to receive one end of the inner strap 24 and outer cover 34. The end caps are made of a plastic material. It should be appreciated that the end caps 36 are attached by suitable means such as the fasteners 26 extending therethrough to the vehicle body 12.

Optionally, the grab handle 22 may include a spacer (not shown) disposed between the inner strap 24 and the headliner 14. The spacer is a generally rectangular plate made of a plastic material. The spacer is disposed between the inner strap 24 and backing sheet 16 to further offset the grab handle 22 from the vehicle body 12.

In operation of the grab handle assembly 10, the grab handle 22 is at an offset from the vehicle body 12 to which it is attached by being disposed in the recess 20 of the headliner 14 and spaced from the vehicle body 12. Under normal vehicle operating conditions, the user may grasp the grab handle 22. Since the grab handle 22 is offset, the grab handle 22 may prevent immediate contact with a stiffer portion of the vehicle body 12 such as the roof side rail or pillar flange during a vehicle collision. If the grab handle 22 is impacted, the inner strap 24 deforms to act as an energy-absorbent spring.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A grab handle assembly for an interior of a motor vehicle comprising:
    a headliner adapted to be disposed in the interior of the vehicle for mounting to a vehicle body of the motor vehicle, said headliner having a first surface facing the interior of the motor vehicle and a recess extending away from said first surface toward the vehicle body to form a second surface; and
    a grab handle extending from said second surface of said headliner toward the interior of the motor vehicle and being non-rotatable and having ends disposed longitudinally within said recess and mounted to said second surface of said headliner, said grab handle being offset from the vehicle body by being disposed in said recess and spaced from the vehicle body to absorb energy when impacted.

2. A grab handle assembly as set forth in claim 1 wherein said grab handle includes an inner strap extending longitudinally and attached to said headliner.

3. A grab handle assembly as set forth in claim 2 wherein said inner strap has a predetermined thickness.

4. A grab handle assembly as set forth in claim 3 wherein said predetermined thickness is three millimeters.

5. A grab handle assembly as set forth in claim 2 wherein said inner strap is made of a metal material.

6. A grab handle assembly as set forth in claim 5 wherein said metal material is mild steel.

7. A grab handle assembly as set forth in claim 2 including a fastener extending through each end of said inner strap and said headliner for attachment to a portion of the vehicle body of the motor vehicle.

8. A grab handle assembly as set forth in claim 2 wherein said grab handle includes an outer cover disposed over a majority of a length of said inner strap.

9. A grab handle assembly as set forth in claim 8 wherein said outer cover is tubular and made of a plastic material.

10. A grab handle assembly as set forth in claim 8 wherein said grab handle includes end caps respectively covering each end of said outer cover.

11. A grab handle assembly as set forth in claim 10 wherein said end cap has a cavity to receive one end of said outer cover.

12. A grab handle assembly as set forth in claim 10 wherein said end cap is made of a plastic material.

13. A grab handle assembly for a motor vehicle comprising:
    a headliner adapted to be disposed in the interior of the vehicle for mounting to a vehicle body of the motor vehicle, said headliner having a first surface facing the interior of the motor vehicle and a recess extending away from said first surface toward the vehicle body to form a second surface; and
    a grab handle extending from said second surface of said headliner toward the interior of the motor vehicle and being non-rotatable and comprising an inner strap and an outer cover disposed over said inner strap, said grab handle having ends being disposed longitudinally within said recess and mounted to said second surface of said headliner, said grab handle being offset from the vehicle body by being disposed in said recess and spaced from the vehicle body to absorb energy when impacted.

14. A grab handle assembly as set forth in claim 13 wherein said inner strap has a predetermined thickness.

15. A grab handle assembly as set forth in claim 14 wherein said predetermined thickness is three millimeters.

16. A grab handle assembly as set forth in claim 13 wherein said inner strap is made of a metal material.

17. A grab handle assembly as set forth in claim 16 wherein said metal material is mild steel.

18. A grab handle assembly as set forth in claim 13 including a fastener extending through each end of said inner strap and said headliner for attachment to a portion of the vehicle body of the motor vehicle.

19. A grab handle assembly as set forth in claim 13 wherein said grab handle includes end caps respectively covering each end of said outer cover.

20. A grab handle assembly for a motor vehicle comprising:
    a headliner adapted to be disposed in the interior of the motor vehicle for mounting to a vehicle body of the motor vehicle, said headliner having a first surface facing the interior of the motor vehicle and a recess extending away from said first surface toward the vehicle body to form a second surface; and
    a grab handle extending from said second surface of said headliner toward the interior of the motor vehicle and being non-rotatable and comprising a metal inner strap extending longitudinally and a plastic outer cover disposed over a majority of a length of said inner strap and end caps respectively covering each end of said outer cover, said end caps being disposed within said recess and mounted to said second surface of said headliner, said grab handle being offset from the vehicle body by being disposed in said recess and spaced from the vehicle body to absorb energy when impacted.

* * * * *